United States Patent [19]

Crass

[11] Patent Number: 4,570,903
[45] Date of Patent: Feb. 18, 1986

[54] METHOD AND APPARATUS FOR MEASUREMENT OF VALVE STEM THRUST

[76] Inventor: Otto G. Crass, 1874 Seventh St., Los Osos, Calif. 93402

[21] Appl. No.: 369,563

[22] Filed: Apr. 19, 1982

[51] Int. Cl.⁴ ............................................. F16K 31/05
[52] U.S. Cl. ........................... 251/129.12; 251/129.03; 73/862.31
[58] Field of Search ...................... 251/130, 133, 134; 73/168, 862.31, 862.49

[56] References Cited

U.S. PATENT DOCUMENTS

| | | | |
|---|---|---|---|
| 2,028,696 | 1/1936 | Beckwith | 251/134 |
| 2,878,687 | 3/1959 | Kron et al. | 251/134 |
| 3,024,403 | 3/1962 | Safford | 251/134 |
| 3,170,339 | 2/1965 | Plume | 251/134 |
| 3,524,526 | 8/1970 | Denkowski | 251/134 |
| 3,720,295 | 3/1973 | Balz | 251/134 |
| 4,346,728 | 8/1982 | Sulzer | 251/134 |
| 4,361,308 | 11/1982 | Buss | 251/134 |

FOREIGN PATENT DOCUMENTS 380350 9/1932 United Kingdom ................ 251/134

*Primary Examiner*—Alan Cohan
*Assistant Examiner*—John A. Rivell
*Attorney, Agent, or Firm*—Limbach, Limbach & Sutton

[57] ABSTRACT

A method and apparatus for directly measuring the thrust present on a valve stem wherein a valve actuator is operated to actuate a valve and to automatically shut off when a predetermined actuator condition is attained, the invention, including a tension load cell supported for coupling to the valve stem to provide a measurement of the thrust present on the externally accessible end of the valve stem to provide a valve stem thrust reading directly without the need to disassemble the valve, or actuator assembly, with minimal hardware requirements, and at low cost.

18 Claims, 4 Drawing Figures

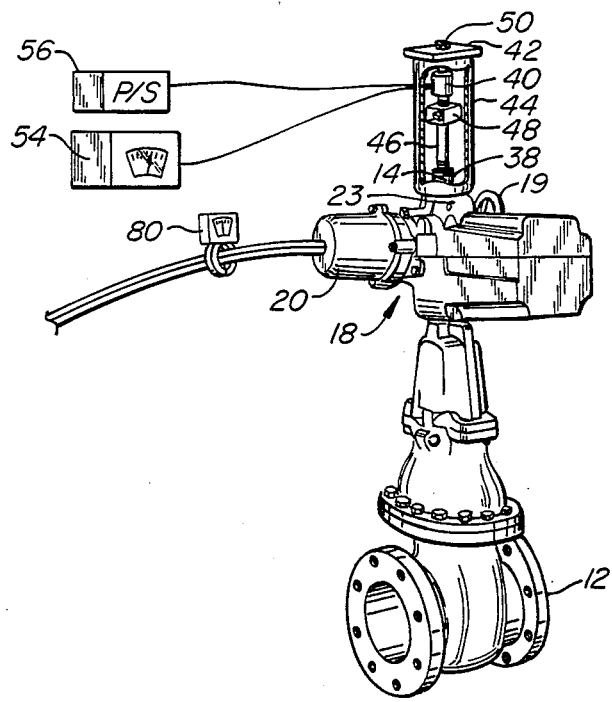
FIG._1.
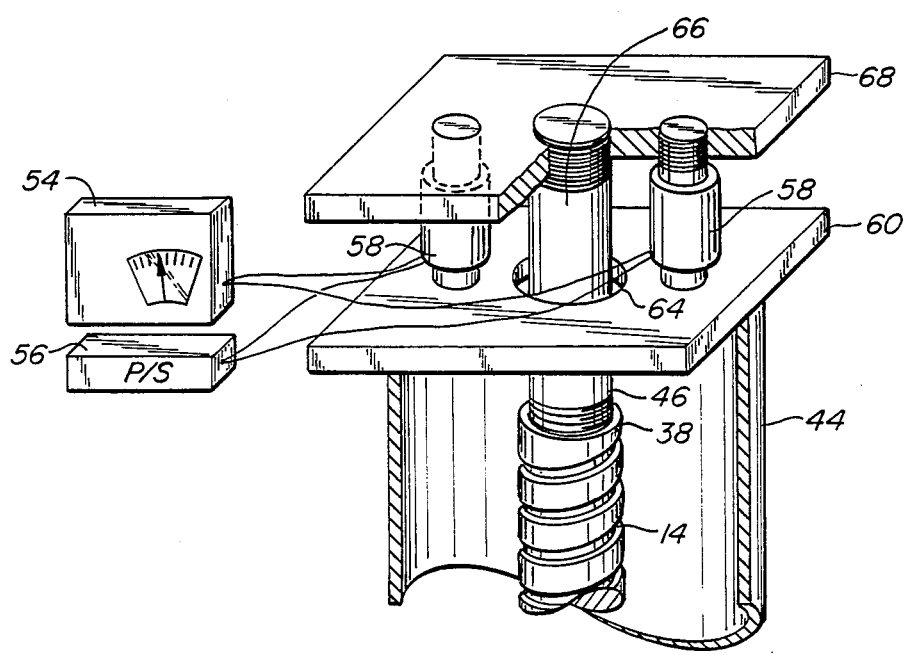
FIG._3.

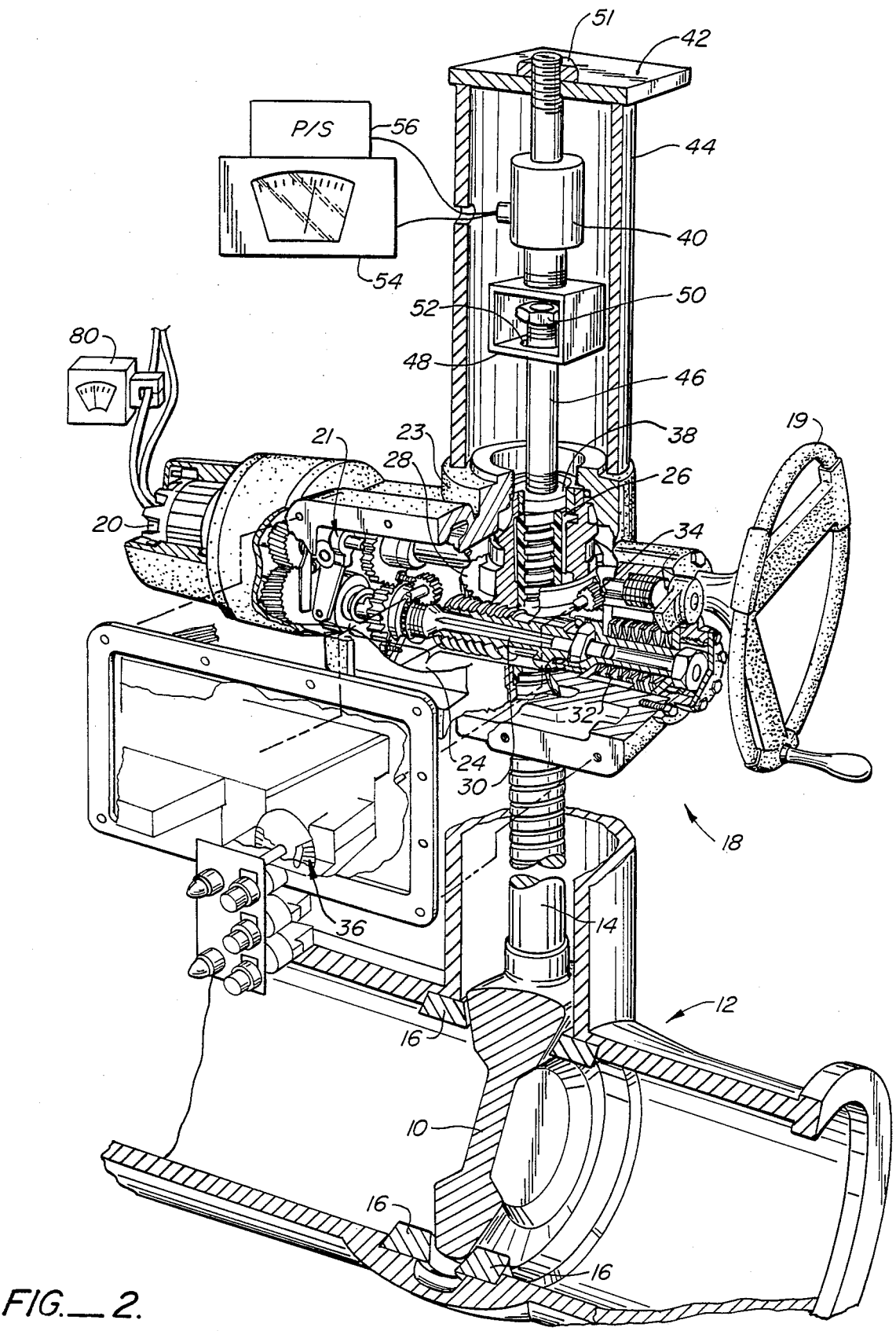
FIG._2.

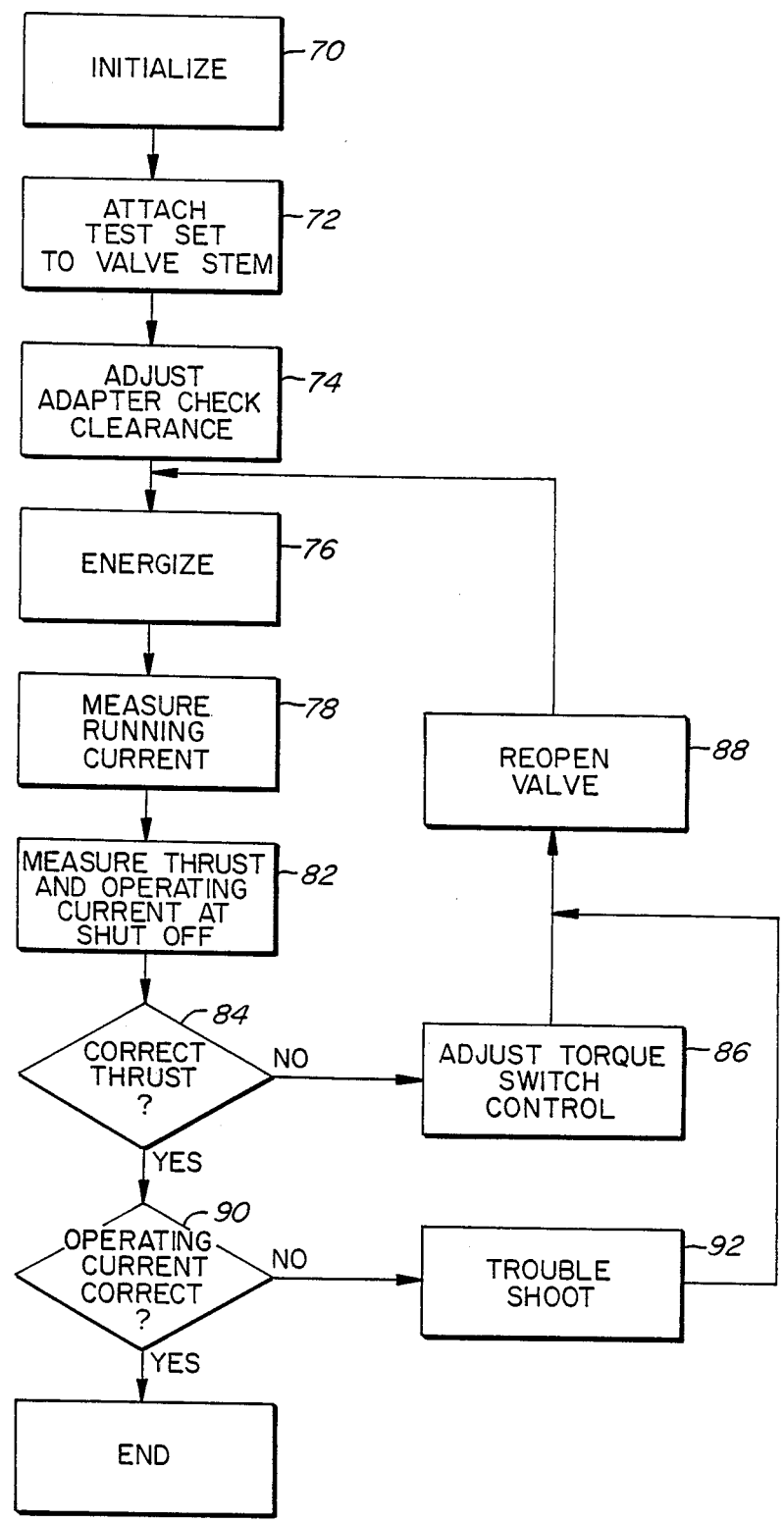
FIG._4.

METHOD AND APPARATUS FOR MEASUREMENT OF VALVE STEM THRUST

BACKGROUND OF THE INVENTION

The present invention is directed to a method and apparatus for the measurement of valve stem thrust in valves and, in particular, to a method and apparatus for measuring and setting the thrust supplied by a valve stem to a valve disc and a valve seat in a pipe valve having a motorized actuator and a torque limiter.

In any valve, in order to stop the flow of fluid through such valve, the valve disc or body must be properly seated against the valve seat and with the appropriate valve stem thrust. This proper seating is all the more critical in high pressure applications.

There are numerous situations in which it is essential that a valve be fully and properly, remotely and quickly closed upon command.

In these applications motorized valve actuators are often employed which, in response to commands from a control center, supply a motive force to the valve stem to close and seat the valve. A motive force which increases in magnitude is supplied to the valve stem until the valve stem supplies a predetermined amount of thrust to the valve disc and the valve seat.

The amount of valve stem thrust required to properly seat a valve is a function of the operating conditions of the valve. For example, in a high pressure valve, a large amount of valve stem thrust is necessary to counteract the high pressure of the fluid flowing through the valve. On the other hand, in a low-pressure application, there would be substantially less pressure present to counteract the thrust applied by the valve stem. In any case, as a function of the operating conditions, the manufacturer of a valve often specifies a minimum amount of valve stem thrust which is required to be applied by the valve stem in order to properly seat a valve in the valve seat.

In the motorized actuators presently used with the above-described valves, a torque limiter is often employed to shut down the motive source whenever a predetermined operating condition is reached in the actuator. Ideally this predetermined condition has a direct correlation with the amount of thrust at the valve stem. Unfortunately, the monitored condition is often only an indirect indication of the actual valve stem thrust present at the valve stem. The result is that once a valve, actuator and torque limiter are assembled and operational in a system, there is no direct method of verifying that the exact amount of thrust required to close the valve is in fact being supplied when the actuator shuts off.

It has been found that the above method, due to various effects, including aging and routine valve maintenance, can be highly ineffective, often resulting in stem thrusts at actuator shut off which are well below the required minimum thrust or well in excess of the maximum thrust that the valve is capable of withstanding. Excess thrust can cause the valve stem to bend, the valve seats to be damaged, the valve disc or body to be distorted, and even render the valve inoperable, often to the point where the valve is stuck closed and manually inoperable.

A malfunctioning valve at the very minimum can cause increased operating and servicing expenses, and in the worst possible scenarios create life-threatening conditions. One example of the former would be in a manufacturing plant where a water-supply valve does not fully close because insufficient thrust is supplied by the valve actuator to the valve stem, thus leading to leakage and waste. An example of the latter situation would be in a steam-driven power plant where an emergency situation requires the shut down of a high-pressure steam line, the failure to do so resulting in pipe rupture or the like.

It is therefore easy to see why there is great interest in developing a method and apparatus by which the proper operation of a valve can be simply and inexpensively determined.

The typical valve for which the present invention is especially suited includes a valve stem which applies thrust to a valve disc to seat the disc into a valve seat. The valve stem is threaded, to accept a valve stem nut, or drive sleeve, which rotates about the valve stem. The valve stem, valve disc and valve seat are housed in a valve housing, with one end of the valve stem extending externally from the housing. The drive sleeve is disposed about the external portion of the valve stem and supported at a fixed distance from the valve housing by a valve actuator. As the drive sleeve is rotated, the valve stem is caused to move upward or downward, depending upon the direction of rotation of the drive sleeve.

The valve actuator includes a motive source which is coupled to the drive sleeve through a transmission assembly. This transmission assembly often takes the form of a worm and worm gear. The worm gear is mounted for rotation with the drive sleeve. The worm is positioned with axis of rotation perpendicular to the axis of rotation of the worm gear. The motive source rotates the worm, the rotation of the worm is transferred to the worm gear for rotation of the worm gear in a plane perpendicular to the plane of rotation of the worm. The rotation of the worm gear is then transferred to the drive sleeve which, in turn, rotates to raise or lower the position of the valve stem.

As the valve disc comes into contact with the valve seat, the valve stem presents an increasing amount of resistance to the rotation of the drive sleeve. This resistance is transmitted to the worm via the worm gear, and results in movement of the worm in a direction away from the motive source.

In order to further rotate the worm, the worm gear and the drive sleeve, the motive source must supply additional force to the transmission assembly.

When a motor is employed as the motive source, it is typically regulated by a torque limiter mechanism which, as discussed above, senses the operating condition of the actuator and disconnects power to the motor whenever a predetermined condition is attained. Typically, the position of the worm with respect to the motor is the condition which is sensed. After the worm has moved a predetermined distance from the motor, as a result of the increased resistance presented by the valve stem, power to the motor is automatically disconnected.

The movement of the worm away from the motor is biased by a spring, typically called a Bellville spring, the amount of compression of which is proportional to the thrust being supplied to the valve stem. The compression of the Bellville spring is tracked by a gear which in turn rotates a rotary switch. The switch is settable so that its contacts are disengaged when it is rotated over the selected angle. The curve obtained by plotting supplied thrust versus rotary switch position of a properly operating unit can then be utilized to set the switches of other similar units. In theory, once a calibration curve is obtained for a properly function unit, other similar units can be set by simply adjusting the torque switch control to a position determined from the calibration curve. It would, therefore, follow that a torque limiter could be set out in the field by simply setting the correct position on the torque switch.

As a verification of the proper functioning of the torque limiter switch, a reading is taken of the operating current of the motor at the point where the motor is deactivated by the torque switch. So long as such operating current falls within the range of 1.5 to 3.0 times the running current, the valve is assumed to be operating correctly. The running current of the motor is defined as the current supplied to the motor when the motor is operating under normal load for the particular valve, i.e., not in the mode where the valve stem is beginning to provide turning resistance to the worm gear.

Once a valve has been installed within a system, the predominant method of verifying that the valve is operating correctly is to set the torque switch position as specified by the manufacturer and to monitor the operating current of the valve in the above manner. So long as the operating current falls within the 1.5 to 3.0 times running current range, the valve is assumed to be functioning properly. In practice, this method has been found to be, at times, highly inaccurate often leading to valve damage, as well as improperly operating valves. This is true because the indirect measurement method used is often not responsive to such occurrences as the aging of components of the valve, such as the Bellville springs, reconfiguration of the actuator to a high-speed or a low-speed mode, servicing of the valve itself, such as repacking of the valve seal, and various other effects.

Additional factors include safety requirements which dictate that the valves and actuators be operational in the presence of operating voltages 80% of normal. This means that when the torque limiter is set to operate properly under the 80% of normal voltage condition, the torque limiter switch will deactivate the actuator at a different operating condition when the actuator is run at the normal voltage level.

This is because, in the field, the torque switch settings are adjusted in part according to the running current of the motor. At a lower voltage, the current supplied to the motor is higher than at normal operating voltages, for the same amount of supply thrust. Therefore, when the operating voltages are raised to normal levels, the operating current at the point of motor deactivation will change hence the amount of thrust supplied at deactivation will change.

This is compounded by the shape of the compression curve of the typical Bellville spring, wherein the amount of force required to further compress the spring when the spring is almost totally collapsed, is very large. Therefore, a small change in spring position under these conditions can correspond to a significant change in the amount of thrust supplied to the valve stem. This makes the setting of the torque switch controls for specified torque values extremely difficult and subject to great inaccuracies.

From the above discussion, it can be seen that the prevalent method of setting and checking torque switches leaves much to be desired. It is not surprising, therefore, that there has been a long-felt need to provide a method and apparatus which permits precise measurement of the actual thrust supplied by a valve stem to the valve disc and valve seat. The present invention provides such a method at low cost and in an easily implemented configuration.

SUMMARY OF THE INVENTION

The foregoing and other problems of prior art, valve stem thrust measuring methods and apparatus are overcome by the present method and apparatus for directly measuring valve stem thrust, in a valve assembly having a valve disc, a valve seat, and a valve stem which are disposed, in part, in a valve housing, and an actuator, the apparatus of which comprises force measuring means positioned for coupling to the externally accessible end of the valve stem, means for mounting the force measuring means to the actuator, means for coupling the force measuring means to the externally accessible end of the valve stem, and means for automatically terminating the operation of actuating means whenever a predetermined actuating means operating state is attained.

The method of the present invention includes the steps of positioning a force measuring device for coupling to the externally accessible end of the valve stem, mounting the force measuring means to the actuator, coupling the force measuring means to the externally accessible end of the valve stem, supplying the actuating force to the valve stem through the actuating means, terminating the valve stem actuation when a predetermined state of the actuating means is reached, and observing the indication of the force measuring means at the point at which the operation of the actuating means was terminated.

The method and apparatus of the present invention also permit the precise setting of the torque limiter switch control to terminate the operation of the actuator when the precise amount of desired thrust is supplied to the valve stem, irregardless of the operating current of the actuator motive source at such point. The method and apparatus of the present invention also permit the valve, torque limiter and actuator to be checked for improperly operating parts. Additionally, there is no need to disassemble the valve in order to practice the method and apparatus of the present invention.

It is therefore an object of the present invention to provide a method and apparatus for the direct measurement of valve stem thrust.

It is a further object of the present invention to provide a method and apparatus for the measurement of valve stem thrust, wherein disassembly of the valve and/or actuator is not required.

It is another object of the present invention to provide a method and apparatus for precisely and accurately setting the point at which a valve actuator is deactivated.

It is still another object of the present invention to provide a method and apparatus which permits the detection of defective or malfunctioning components in a valve and valve actuator assembly.

It is a still further object of the present invention to provide a method and apparatus for direct measurement of valve stem thrust at low cost and with minimal required hardware.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 illustrates the positioning of the apparatus with respect to a valve actuator and the valve housing.

FIG. 2 illustrates, in greater detail, one embodiment of the apparatus of the present invention.

FIG. 3 illustrates an alternative embodiment of the present invention utilizing compression type force measuring means.

FIG. 4 is a flow diagram of the steps of the method of the present invention.

DETAILED DESCRIPTION OF THE PREFERRED EMBODIMENTS

Referring more particularly to FIG. 1, the orientation of the apparatus with respect to the valve actuator and the valve housing can be appreciated. An actuator 18 is mounted to the valve housing 12 so that the valve stem 14 passes through the actuator 18. The apparatus of the present invention mounts to the actuator housing 23 in a position for coupling to the valve stem.

FIG. 2 illustrates the typical actuator/valve configuration. The valve disc 10 is contained within the valve housing 12. The position of the valve disc 10 is controlled by the position of valve shaft 14. When the valve is open, valve disc 10 is raised out of contact with valve seat 16. When the valve is fully closed, the valve disc 10 is in full contact with valve seat 16. Valve stem 14 extends from the valve disc 10 to the exterior of the valve housing 12. An actuator 18 is positioned on the valve stem external to the valve housing. The valve actuator includes a manual actuation section 19 so that the valve can be operated by hand, and a motorized actuation section 21 which is responsive to a signal supplied, for example from a remote control room.

The motorized section of the valve actuator includes a motor 20, or motive source, a torque limiter or a torque switch 36, and a transmission assembly 24.

As previously described, the transmission assembly comprises, in the typical case, a valve drive nut 26, a worm gear 28, and a worm 30. The torque switch 36 tracks a Bellville spring 32 which is in contact with one end of the worm 30. Gearing 34 monitors the compression of the Bellville spring 32 by the worm 30 and translates such movement into movement of mechanical torque switch assembly 36. The mechanical torque switch assembly 36 is a rotary switch and is configured to disconnect the power source to the motor 20 whenever a designated compression of the Bellville spring 32 is attained.

In reality, and as can be seen from FIG. 2, there are numerous factors which modify the valve stem thrust actually supplied to the valve disc 10. For example, the compression curve of the Bellville spring 32 often changes with age, therefore permitting a greater travel of the worm 30 for a given amount of thrust. Additionally, drive losses occur in the coupling between the worm 30 and worm gear 28, the worm gear 28 and valve drive nut 26, and the valve drive nut 26 and the valve stem 14.

A further contributor to torque switch inaccuracy is the fact that the Bellville spring 32 compression curve is non-linear, that is, the further the spring 32 is compressed, the greater the force required to further compress the spring. Therefore, in the high compression area of operation, just a small positional movement of the worm 30 can correspond to a very large change in the amount of thrust supplied. It can therefore be appreciated that adjustment of the torque switch deactivation point by adjustment of the mechanical torque switch position 36 can lead to great inaccuracies as to the actual thrust applied by the valve stem 14. It can further be appreciated that when the operating current of the motor 20 is used to verify the proper operation of the valve torque switch and actuator, great inaccuracies can arise. This is especially true since such a large range of operating currents (1.5 to three times that of the running current of the motor) are deemed to be acceptable.

In order to overcome the various problems discussed above, the present invention provides a method and apparatus for the direct measurement of thrust present on a valve stem. As can be seen from FIGS. 1 and 2, the apparatus attaches to the externally accessible end 38 of the valve stem 14. A tension load cell 40 is positioned above the externally accessible end 38 of the valve stem 14. One end of the tension load cell 40 is attached to a plate 42. Plate 42 can be either tapped to accept the end of tension load cell 40, or the tension load cell 40 can be inserted through plate 42 and secured by a nut 51.

Plate 42, in turn, is supported by support structure 44. Support structure 44 can be a pipe, a plurality of rods, or some other high-strength structure. Support structure 44 is shaped to rest upon that part of the actuator housing 23 through which the externally accessible end 38 of the valve stem emerges.

The other end of load cell 40 is coupled to the valve stem end 38 through a coupling structure 46. The coupling structure can be a high-strength, non-yielding rod or the like. The end of coupling structure 46 which attaches to the valve stem end 38 is threaded. Typically, the externally accessible end of a valve stem is threaded so that visual position indicators can be inserted. In order to utilize the present invention with such an arrangement, the position indicator is removed and the coupling structure 46 is substituted.

The coupling structure 46 is attached to the end of the tension cell through adaptor 48. Adaptor 48, at the point at which it attaches to load cell 40, is threaded to screw onto load cell 40. At the end where adaptor 48 attaches to coupling structure 46, a sufficiently large aperture 52 is provided to permit coupling structure 46 to freely pass through to the interior of adaptor 48. A nut 50 is threaded onto the coupling structure 46 after it passes through the aperture 52. The output of tension load cell 40 is monitored by a meter or appropriate monitoring means 54. Additionally, the appropriate power supply 56 is supplied to the tension load cell. As can be seen from FIG. 2 the tension load cell is independent of transmission assembly 24.

In the configuration of the present invention, the thrust present on the valve stem can be measured directly. When this technique of direct measurement of valve stem thrust was first proposed, it was met with immediate skepticism. One of the major limitations suggested at the time was that no account was taken for other forces which act upon the valve stem, such as valve stem packing. The valve stem packing, it was argued, provides sliding resistance to the valve stem 14 and, as such, must be considered in determining the actual thrust supplied by the valve stem to the valve and valve seat. Contrary to this initial skepticism, it has been found that the method and apparatus for the present invention does take into account the effects of valve packing. This is so because the quantity being measured by the present invention is the net force of all of the forces being applied to the valve stem, including the thrust supplied by the motive supply and transmission assembly, as well as sliding resistance provided by the valve packing.

In effect, the tension load cell 40 is being substituted for the valve disc 10 and valve seat 16. The force applied by the end of the valve stem 14 which is in contact with the valve disc 10, and hence the valve seat 16, provides the same amount of force as does the externally accessible end of the valve stem. This is because the valve stem is a rigid member and, as such, the forces applied to the valve stem 14 at any point along the valve stem have an effect upon the net force present at any other point along the valve stem 14. The tension load cell 40, therefore, measures the same amount of force to which the valve disc 10 and valve seat 16 will be subjected, only instead of measuring at the valve and valve seat end of the valve stem, the forces being measured at the externally accessible end 38 of the valve stem 14.

This direct measurement of the actual force being applied to the valve disc 10 and the valve seat 16 by the valve stem 14 is in clear contrast to the technique of regulating valve stem thrusts using the torque limiter switch alone. The torque limiter switch 36 acts as a function of the torque supplied to the valve stem 14 by way of the worm 30, the worm gear 28, and the valve drive nut 26. In such an arrangement, the torque limiter switch 36 is monitoring the torque supplied to the worm 30, not the thrust which is actually present on the valve stem 14. The torque limiter switch 36 will deactivate the motor 20 whenever the torque presented by the worm 30 reaches a predetermined level. The torque limiter switch 36 is, therefore, not affected by changes within the valve itself, such as change in packing resistance. So long as the worm 30 continues to supply a predetermined amount of torque, the torque limiter switch 36 will shut down the motor 20 accordingly. Therefore, if the packing resistance were to be decreased, the actual thrust being supplied to the valve disc 10 and valve seat 16 can be greater than the level desired. On the other hand, if the packing resistance is increased, the thrust supplied by the valve stem to the valve disc 10 and valve seat 16 could be less than what is required.

Additionally, even if the valve configuration has changed such that the other forces acting upon the valve stem have decreased, the actuator could easily be supplying thrusts in excess of those required, with the operating current of the motor still falling within the 1.5 to three times the running current specification.

With the method and apparatus of the present invention, the actual thrust supplied by the valve stem is measured. Therefore the above problems are avoided.

The apparatus of the present invention includes, in its operation, the use of the limiter switch to de-energize the motor 20 at a designated point. The torque switch 36 is used in this instance not so much as a measuring device, but rather as a device whose shut-off point can be set to correspond to a particular operating condition of the actuator 18 which, in turn, corresponds to a particular thrust as measured on the valve stem 14 itself. By measuring the thrust present on the valve stem in the method of the present invention at the point of actuator deactivation by the torque limiter, the valve stem thrust applied to the valve disc and valve seat in the actual operation of the valve, actuator, and torque limiter, can be precisely determined.

Generally, the method of the present invention includes the following steps. The valve stem 14 is first positioned so that the valve is in an open state. The apparatus is then coupled to the valve stem 14 so that the support structure 44 rests upon the actuator housing, the mounting plate 42 rests upon the support structure 44, one end of the tension load cell 40 connects to the mounting plate, and the other end of the tension load cell 40 connects to the externally accessible end 38 of the valve stem 14 via a coupling structure 46 and adaptor 50. The torque limiter switch is set at a particular point. The valve actuator 18 is then energized until the torque switch 36 deactivates the motor 20. At this point, the force present on the valve stem is measured via meter 54. The valve stem 14 is then returned to the open position and, depending upon the force measured, the torque switch 36 setting is modified in a direction so that the motor will tend to be shut off at a point where the thrust present on the valve stem 14 is closer to the desired thrust. The valve actuator 18 is then re-energized until the torque switch 36 deactivates the motor 20. The force present on the valve stem 14 is again measured and the torque switch 36 setting is again modified. This process is repeated until the correct force is present on the valve stem 14 when the torque switch 36 deactivates the motor 20.

The tension load cell 40 used in the present invention is well-known in the art and widely available. Preferably, a tension load cell having an output which corresponds, on a factor of ten basis, to the forces to be measured is desirable. This is so that the meter-reading can be taken directly as an indication of the amount of force present and a shift in the decimal point, rather than having to multiply by some non-factor of ten constant, is all that is required for determining the thrust magnitude. In the load cell utilized in the present invention, a reference voltage source 56 is supplied to the load cell. For the purposes of the present invention, any force measuring means capable of measuring the magnitudes of the forces present in the particular configuration being measured are acceptable. These alternate force measuring means include mechanical indicators, strain gauges, and oscillating stringtype force measuring means.

The coupling structure 46 is preferably constructed of high-strength steel such as 4140 steel. The support structure 44 is preferably a pipe, such as a six-inch schedule forty pipe. Other support structures, so long as they are capable of supporting the magnitudes of forces which will be measured by the apparatus, are satisfactory. The load cell 40 can be threaded into the mounting plate 42 or inserted through the plate and secured with a nut.

The adaptor structure 48, in the preferred embodiment of the present invention, comprises a boxlike structure having opposing faces, one of which is threaded to accept a threaded end of the tension load cell 40. The opposing side of the adaptor structure 48 has an aperture 52 which is sufficiently large to permit the coupling structure 46 to pass through.

The portion of the coupling structure 46 which passes through the aperture 52 is threaded to accept a nut 50. The nut 50 is threaded onto the coupling structure so that the coupling structure is free to move in a direction toward the tension load cell 40, but is restrained from being removed totally from the adaptor structure 48. The reason for this small amount of "play" is to permit the valve stem 14 to travel a short distance through which there is no loading upon the valve stem, other than by forces such as valve packing. This permits a measurement of the running current of the motor to be taken. The amount of play is kept small so that when the tension load cell begins to present a load to the valve stem 14, the valve disc 10 and valve seat 16 remain out of contact with each other. In the typical valve, once a load is supplied to the valve shaft 14, there is only a small amount of movement of the valve stem 14 before the full amount of thrust is present on the valve stem 14.

As part of a double-check in the method of the present invention, the motor-running current is monitored during the no-load actuation of the valve stem, and also at the point at which the torque limiter switch deactivates the motor 20. This measurement serves several purposes. First of all, it provides a gross check upon the proper functioning of the total assembly. Second of all, should any problems be present in the motor, gearing, or valve, such problems could conceivably show up in a different-than-expected running and closing current of the motor.

In this manner, the method and apparatus of the present invention can be used to troubleshoot and to inspect the valve for proper operation. By monitoring the operating current of the motor 20 when the desired amount of thrust is being supplied by the valve stem 14, it can be determined whether the motor is too large or too small for the particular application. A too large motor could result in extreme damage to the valve and associated parts should the torque limiter switch 36 fail to deactivate at the proper point. On the other hand, a too small motor may cause the valve to fail to close fully.

If, during the measurement of the thrust, it is found that the operating current far exceeds the specified range, the operator is immediately informed that a problem exists within the system. Some of these problems include restrictions in the transmission portion 24 of the actuator, or a damaged valve mechanism.

An alternative configuration of the present invention is illustrated in FIG. 3. In this configuration, compression load cells 58 are substituted for the tension load cells 40 of the first configuration. This alternate configuration permits a smaller clearance requirement; hence, can be used in areas where space is limited.

In this alternate configuration, compression load cells 58, shown in FIG. 3, are substituted for the tension load cell 40. A first plate 60 is positioned to rest upon actuator housing 23 at the point where the externally accessible end 38 of the valve stem 14 emerges. Plate 60 has an aperture 64 which is shaped to permit free passage of the valve stem end 38 and coupling structure 66.

A second plate 68 is positioned above first plate 60. Coupling structure 66 is threaded or welded to second plate 68. Compression cells 58 are positioned between first plate 60 and second plate 68, preferably along a radial line through coupling structure 66 and equal distance therefrom. A minimum of two compression load cell 58 should be used to ensure a proper in-line distribution of the forces presented by plate 68 via coupling structure 66 to the load cells 58.

Load cells 58 can be secured to one of the plates 60 or 68.

Stem thrust measurements using this configuration are taken in generally the same manner as with the configuration of FIG. 2. However, the outputs of all of the compression load cells 58 used must be summed in order to obtain the total amount of thrust present on the valve stem 14.

As before, high-strength materials are preferable.

The height clearance required for this configuration is approximately six inches.

FIG. 4 illustrates a more detailed set of steps which implement the method of the present invention. In step 70, the operator initializes the valve for testing. This initialization process includes shutting off the flow of fluids through the pipe to which the valve is attached, and to "stroke" the valve into an opened position. In step 72, the operator attaches the test apparatus to the valve stem 14 and actuator housing 23. In step 74, the operator adjusts adaptor 48 so that there is some "play" between the coupling structure 46 and the adaptor 48. Additionally, the operator, at this point, verifies that when the coupling structure 46 comes into contact with the adaptor 48, the valve disc 10 and valve seat 16 remain out of contact with each other. In step 76, the operator energizes the actuator. In step 78, the operator takes a measurement of the running current of the motor, using an ammeter 80. In step 82, the operator takes the thrust reading from tension load cell 40 and meter 54, and measures the operating current of the motor at the time of shut off, using ammeter 80.

In step 84, the operator compares the measured thrust to the desired thrust. If the thrust is not correct, the operator adjusts the torque switch control, in step 86, in a direction which tends to provide the correct thrust and then proceeds back to step 76 to repeat the measurement process. Step 88 is provided to re-initialize the valve in preparation for another measurement.

If in step 84 the thrust is determined to be correct, the operator proceeds to step 90 in which it is determined whether the operating current at the point of actuator shut-off falls within the desired 1.5 to three times running current range. If such is not the case, the operator proceeds to step 92 in which trouble-shooting is performed. After correcting the problem, the operator then proceeds to step 88 in which the measurement process is repeated.

If in step 90 the operating current is found to be proper, the test is terminated.

From the above material, it is clear that use of the apparatus and method of the present invention is not limited to setting and measuring valve stem thrust in valves which utilize motorized valve actuators. So long as some means are provided which will deactivate the motive source to the actuator when a predetermined condition of the actuator is reached, any source of motive power can be used successfully with the present invention. For example, the present invention can be utilized with a manually operated valve actuator. So long as means are provided which will deactivate the operation of the manual actuator when a predetermined condition exists in the manual actuator, the apparatus can be used to measure the thrust present when the actuator is disconnected, and to set the predetermined condition so that the proper amount of thrust is present at the time of deactivation.

The present invention can also be used as a training tool to permit operators of the valve to "get a feel" for the proper amount of force which should be applied when using the manual actuator in shutting down a valve. In the past, it has been found that depending upon the operator closing the valve, great differences in stem thrusts have been applied to the valves and valve seat for the same valve.

The terms and expressions which have been employed here are used as terms of description and not of limitation, and there is no intention, in the use of such terms and expressions, of excluding equivalents of the feature shown and described, or portions thereof, it being recognized that various modifications are possible within the scope of the invention claimed.

What is claimed is:

1. An apparatus for measuring the actual thrust supplied by a valve stem to a valve body and associated valve seat, the valve body, valve seat and valve stem being disposed within a housing, wherein one end of the valve stem is accessible externally to the housing, and further wherein an actuating force is applied to the valve stem by actuating means and a transmission assembly which are positioned in a housing, the apparatus comprising force measuring means positioned for coupling to the externally accessible end of the valve stem;

means for mounting the force measuring means to the housing of the actuator means and independently of the transmission assembly;

means for coupling the force measuring means to the externally accessible end of the valve stem to provide an instantaneous measurement of the axial force on the stem; and means for terminating the operation of the actuating means whenever a predetermined actuator means operating state is reached.

2. The thrust measuring apparatus, as recited in claim 1, wherein the actuating means include a motorized valve actuator which indirectly applies the actuating force to the valve stem by rotating a valve stem nut by way of a worm gear assembly, and further wherein the termination means comprise means for measuring the positional movement of the worm gear assembly; and means for automatically de-energizing the motorized valve actuator whenever the worm assembly attains a predetermined position.

3. The thrust measuring apparatus, as recited in claim 1, wherein the force measuring means is a tension load cell.

4. The thrust measuring apparatus, as recited in claim 1, wherein the force measuring means include a compression load cell.

5. The thrust measuring apparatus, as recited in claim 3, wherein the mounting means comprise a plate for supporting one end of the tension load cell; and rigid support means having one end shaped for mounting to the actuator means and an opposite end shaped to support the plate.

6. The thrust measuring apparatus, as recited in claim 5, wherein the rigid support means is a steel cylinder.

7. The thrust measuring apparatus, as recited in claim 5, wherein the support means include a plurality of steel rods, each rod having a threaded first end for coupling to the plate, and a second end shaped for mounting to the actuator means.

8. An apparatus for measuring the actual thrust supplied by a valve stem to a valve body and associated valve seat, the valve body, valve seat and valve stem being disposed within a housing, wherein one end of the valve stem is accessible externally to the housing, and further wherein an actuating force is applied to the valve stem by actuating means, the apparatus comprising force measuring means positioned for coupling to the externally accessible end of the valve stem;

means for mounting the force measuring means to the actuator means;

means for coupling the force measuring means to the externally accessible end of the valve stem to provide an instantaneous measurement of the axial force on the stem, wherein the coupling means include a rod having a first end shaped for mounting to the externally accessible end of the valve stem, and a second end;

adaptor means, one end of which is attached to the force measuring means and the other end of which is coupled to the second end of the rod, for adjustably coupling the rod to the force measuring means, the adapter means being adjustable to provide a coupling between the rod and the force measuring means which is moveable between a first position in which the rod slides freely through the adapter means and a second position in which the rod is tightly coupled to the adapter means; and means for terminating the operation of the actuating means whenever a predetermined actuator means operating state is reached.

9. An apparatus for measuring the actual thrust supplied by a valve stem to a valve body and associated valve seat, the valve body, valve seat and valve stem being disposed within a housing, wherein one end of the valve stem is accessible externally to the housing, and further wherein an actuating force is applied to the valve stem by actuating means, the apparatus comprising force measuring means positioned for coupling to the externally accessible end of the valve stem and including a plurality of compression load cells;

means for mounting the force measuring means to the actuator means, wherein the mounting means comprise a first platform shaped to rest upon the actuator means and having a first aperture through which the valve shaft can extend;

a second platform disposed above the first platform and shaped for attachment to the coupling means, the plurality of compression load cells being positioned between the first and second platforms and in contact therewith so that movement of the valve stem into the valve housing is transferred to the second platform which, in turn, compresses the compression load cells;

means for coupling the force measuring means to the externally accessible end of the valve stem to provide an instantaneous measurement of the axial force on the stem; and means for terminating the operation of the actuating means whenever a predetermined actuator means operating state is reached.

10. The thrust measuring apparatus, as recited in claim 8, wherein the externally accessible end of the valve stem is bored and tapped to accept a threaded member, and further wherein the first end of the rod is threaded for coupling to the threaded externally accessible end of the valve stem.

11. An apparatus for measuring the actual thrust supplied by a valve stem to a valve body and associated valve seat. the valve body. valve stem and valve seat being disposed within a housing, wherein one end of the valve stem is accessible external to the housing, the accessible end being bored and tapped to accept a threaded member, and further wherein an actuating force is applied to the valve stem by actuating means and a transmission assembly which are positioned in a housing, the apparatus comprising actuator torque limiting means for terminating the operation of the actuating means whenever a predetermined operating state of the actuator is attained;

a tension load cell positioned for coupling to the externally accessible end of the valve stem;

a non-yieldable rod having a threaded first end and a threaded second end, the first end being threaded into to the externally accessible end of the valve stem;

an adapter for coupling the second end of the rod to the tension load cell; and a mounting stand for supporting the tension load cell on the housing of the actuating means and independently of the transmission assembly so that the resultant forces present on the valve stem with respect to the valve housing can be measured.

12. A method of measuring the actual thrust supplied by a valve stem to a valve body and associated valve seat, the valve body, valve stem and valve seat being disposed in a valve housing, wherein one end of the valve stem is accessible external to the valve housing, and further wherein an actuating force is applied to the valve stem by actuating means by way of a transmission assembly, said actuating means and transmission assembly being positioned in a housing; the method comprising the steps of positioning a force measuring device for coupling to the externally accessible end of the valve stem;

mounting the force measuring device to the housing of the actuating means and independently of the transmission assembly;

coupling the force measuring device to the externally accessible end of the valve stem;

energizing the actuating means to supply actuating force to the valve stem;

deenergizing the actuating means when a predetermined state of the actuating means is reached; and observing the indication of the force measuring means at the point at which the operation of the actuating means was terminated.

13. A method of measuring the actual thrust supplied by a valve stem to a valve body and associated valve seat, the valve body, valve stem and valve seat being disposed in a valve housing wherein one end of the valve stem is accessible external to the valve housing, and further wherein an actuating force is applied to the valve stem by actuating means, wherein the actuating means is disposed in an actuator housing which is mounted to the valve housing; the method comprising the steps of positioning a force measuring device for coupling to the externally accessible end of the valve stem;

mounting the force measuring device to the actuating means, wherein the mounting step includes the steps of fastening one end of the force measuring means to a plate which is positioned above the externally accessible end of the valve stem;

mounting the plate to one end of a support structure; and fastening the other end of the support structure to the actuator housing;

coupling the force measuring device to the externally accessible end of the valve stem;

energizing the actuating means to supply actuating force to the valve stem;

deenergizing the actuating means when a predetermined state of the actuating means is reached; and observing the indication of the force measuring means at the point at which the operation of the actuating means was terminated.

14. The method of measuring thrust, as recited in claim 13, wherein the coupling step includes the steps of screwing one end of a high tensile strength rod into the externally accessible end of the valve stem. the valve stem end being bored and tapped to receive the high tensile strength rod; and coupling the other end of the high tensile strength rod to the force measuring means so that any force present at the valve stem is transmitted directly to the force measuring means.

15. The thrust measuring method, as recited in claim 12, wherein the actuating means include a motive supply, wherein a motive force is supplied by the motive supply which is applied to the valve stem by way of a worm. worm gear and valve stem nut arrangement, and further wherein the terminating step includes the steps of sensing the physical position of the worm with respect to the motive supply; and halting the operation of the motive supply whenever the worm attains a predetermined position relative to the motive supply.

16. A method of setting valve stem thrust in a valve in which a valve stem applies thrust to the valve body to seat the valve body against a valve seat, wherein the valve body and the valve seat are contained within a valve housing, the valve stem having an end which is externally accessible, and further wherein actuating means supply an actuating force to the valve stem by way of a transmission assembly, the method comprising the steps of positioning a force measuring device for coupling to the externally accessible end of the valve stem;

mounting one end of the force measuring device to the valve housing and independently of the transmission assembly of the actuating means;

coupling the other end of the force measuring device to the externally accessible end of the valve stem;

applying the actuating force to the valve stem;

terminating the valve stem actuation when the actuating means reaches a predetermined operating state;

comparing the indication of the force measuring means to a predetermined value;

adjusting the terminating means so that the valve actuation will be terminated at an operating state in which the difference between the force measuring means indication and the predetermined value tends toward zero; and repeating the force application, comparison and termination adjustment steps until the indicated force measurement approximately equals the predetermined value.

17. An apparatus for measuring the actual thrust supplied by a valve stem to a valve body and associated valve seat, the valve body, valve stem and valve seat being disposed within a valve housing, wherein one end of the valve stem is accessible external to the housing, and further wherein actuating means, positioned in a housing, supply an actuating force to the external end of the valve stem by way of a transmission assembly, the actuator means being supported by the valve housing, wherein actuator torque limiting means which are communicatively coupled to the actuating means deenergize the actuator means whenever a designated operating state of the actuating means is attained, the apparatus comprising force measuring means;

mounting means for positioning the force measuring means for coupling to the externally accessible end of the valve stem and for mounting the force measuring means to the housing of the actuator means and independently of the transmission assembly; and means for communicatively coupling the force measuring means to the externally accessible end of the valve stem, so that the valve stem is moveable between a first position in which the force measuring means are disengaged from communication with the valve stem and a second position in which the force measuring means are in communication with the valve stem, wherein in the second position the force measuring means supply the loading to the valve stem to cause the actuator torque limiting means to deenergize the actuating means.

18. A method of measuring the actual thrust supplied by a valve stem to a valve body and associated valve seat, the valve body, valve stem and valve seat being disposed in a valve housing wherein one end of the valve stem is accessible external to the valve housing, and further wherein an actuating force is applied to the valve stem by actuating means; the method comprising the steps of positioning a force measuring device for coupling to the externally accessible end of the valve stem;

mounting the force measuring device to the actuating means;

coupling the force measuring device to the externally accessible end of the valve stem, including the steps of screwing one end of a high tensile strength rod into the externally accessible end of the valve stem the valve stem end being bored and tapped to receive the high tensile strength rod; and coupling the other end of the high tensile strength rod to the force measuring means so that any force present at the valve stem is transmitted directly to the force measuring means;

energizing the actuating means to supply actuating force to the valve stem;

deenergizing the actuating means when a predetermined state of the actuating means is reached; and observing the indication of the force measuring means at the point at which the operation of the actuating means was terminated.

* * * * *